(12) United States Patent
Rotsaert

(10) Patent No.: US 10,417,461 B2
(45) Date of Patent: Sep. 17, 2019

(54) COMPACT CARD READER FOR A MOBILE COMMUNICATION TERMINAL

(71) Applicant: ROAM DATA, INC., Wilmington, DE (US)

(72) Inventor: Christopher Rotsaert, Wasquehal (FR)

(73) Assignee: INGENICO INC., Alpharetta, GA (US)

(*) Notice: Subject to any disclaimer, the term of this patent is extended or adjusted under 35 U.S.C. 154(b) by 0 days.

(21) Appl. No.: 15/746,706

(22) PCT Filed: Jul. 20, 2016

(86) PCT No.: PCT/IB2016/054326
§ 371 (c)(1),
(2) Date: Jan. 22, 2018

(87) PCT Pub. No.: WO2017/013606
PCT Pub. Date: Jan. 26, 2017

(65) Prior Publication Data
US 2018/0225484 A1    Aug. 9, 2018

(30) Foreign Application Priority Data
Jul. 20, 2015 (FR) ...................... 15 56838

(51) Int. Cl.
*G06K 7/08* (2006.01)
*G06K 7/00* (2006.01)

(52) U.S. Cl.
CPC ............. *G06K 7/084* (2013.01); *G06K 7/006* (2013.01); *G06K 7/0021* (2013.01)

(58) Field of Classification Search
CPC ....... G06K 7/084; G06K 7/0021; G06K 7/006
See application file for complete search history.

(56) References Cited

U.S. PATENT DOCUMENTS

| D711,876 S | 8/2014 | McWilliam et al. |
| 9,760,740 B1* | 9/2017 | Edwards .............. G06Q 20/204 |
| 2003/0089773 A1 | 5/2003 | Kanayama |
| 2007/0152051 A1* | 7/2007 | Schulz ..................... G06K 7/00 235/449 |
| 2009/0302109 A1* | 12/2009 | Kerner ................. G06K 7/0013 235/439 |
| 2014/0131442 A1 | 5/2014 | Morrow et al. |

(Continued)

FOREIGN PATENT DOCUMENTS

| EP | 2919168 A1 | 9/2015 |
| FR | 2805636 * | 8/2001 |
| FR | 2805636 A3 | 8/2001 |

(Continued)

OTHER PUBLICATIONS

International Search Report and Written Opinion dated Sep. 16, 2016, for international application No. PCT/IB2016/054326 filed Jul. 20, 2016.

(Continued)

*Primary Examiner* — Laura A Gudorf
(74) *Attorney, Agent, or Firm* — David D. Brush; Westman, Champlin & Koehler, P.A.

(57) ABSTRACT

A card reader includes a printed circuit board, a magnetic head and a smart card connector. The magnetic head and the smart card connector share a common operating volume for card reading.

10 Claims, 5 Drawing Sheets

(56) References Cited

U.S. PATENT DOCUMENTS

2014/0299664 A1 10/2014 Ardis et al.

FOREIGN PATENT DOCUMENTS

| FR | 2997533 A1 | 5/2014 |
|----|------------|--------|
| WO | 2013074499 A1 | 5/2013 |
| WO | 2015015661 A1 | 2/2015 |

OTHER PUBLICATIONS

English Translation of the International Search Report dated Sep. 16, 2016 for international application No. PCT/IB2016/054326 filed Jul. 20, 2016.

International Preliminary Report on Patentability, and English Translation dated May 22, 2017, for international application No. PCT/IB2016/054326 filed Jul. 20, 2016.

\* cited by examiner

COMPACT CARD READER FOR A MOBILE COMMUNICATION TERMINAL

CROSS-REFERENCE TO RELATED APPLICATIONS

This Application is a Section 371 National Stage Application of International Application No. PCT/IB2016/054326, filed Jul. 20, 2016, which is incorporated by reference in its entirety and published as WO 2017/013606 A1 on Jan. 26, 2017, not in English.

FIELD

The technique proposed relates to the field of payment terminals. More particularly, the technique proposed relates to the field of compact payment terminals. The invention relates more specifically to the field of payment terminals that can be connected to communication terminals. Further more specifically, the technique relates to a payment terminal architecture that integrates a printed circuit board (PCB) and that integrates a magnetic reading head.

PRIOR ART

Payment cards are widely used in the world to carry out financial transactions, and more specifically payment transactions, physically in a shop, as well as on line, by the intermediary of a dedicated application. A payment card is often provided with a magnetic strip and/or an electronic chip. The magnetic strip and the electronic chip make it possible to carry out payment transactions. The magnetic strip contains data that is read using a magnetic head integrated into the payment terminal. The magnetic strip actually contains three separate parallel magnetic strips, with each one comprising specific data. The electronic chip however generally comprises a processor, a memory; it carries out a joint and secure processing with the payment terminal for the purpose of executing the transaction. As such, when it is used, the card is either inserted into a card reader provided with a magnetic head or inserted into a reader, called a CAM reader, comprising a smart card connector.

In order to facilitate payments by bank card and allow users to have new means of payment, removable card readers were proposed on the market. This is for example the case of the magnetic card reader of the Amazon™ company with the "Amazon Local Register™" product and the associated card reader. Such a card reader is for example described in document USD711876. Other readers of this type existent. These removable readers are for example provided with a communication module and can be paired with a communication device in order to communicate with remote payment servers. For reasons of portability and aesthetics, it is interesting to reduce the size of removable readers, in particular when such readers are able to be paired with a compact communication device, for example of the smartphone type. Indeed, with the development of the technique, the thickness of communication devices (mobile telephone, tablet etc.) is today about less than ten millimeters. It is desirable that the thickness of removable readers be close to that of communication devices. However, currently, the readers of prior art suffer from two major problems: the first problem is linked to the fact that the payment interfaces of these compact devices are limited to reading magnetic cards. Sometimes, an interface of the contactless type (NFC) is also present. However, the reading of the chip of the payment card is generally not possible. The second problem is linked to the size of the product and more particularly to its thickness: as can be seen in document USD711876, the removable reader has a substantial thickness. However the reader of document USD711876 does not even integrate a smart card reader. Another company markets a removable reader that is plugged into the jack socket of a mobile communication device that comprises a slot for the reading of smart cards and a slot for the reading of magnetic cards. Such a device is described in document WO2013074499.

In an example of prior art, shown in relation with FIG. 1, the card reader 10 comprises a printed circuit board (PCB) 101 and a magnetic head 102. The magnetic head 102 is placed on a flexible displacement element 1021, which is itself fastened onto the printed circuit board. The flexible displacement element 1021 allows the magnetic head 102 to undergo a movement in the direction of the printed circuit board when a magnetic card passes on the magnetic head. This makes it possible to provide an optimum contact between the magnetic strip of the card and the reading head. Moreover, a connection 1022 is established between the printed circuit board 101 and the magnetic head 102 in order to transmit the electrical signals read by the magnetic head. This connection is for example a flexible printed circuit. The thickness of the card reader 10 is restricted by the sum of the thickness of the printed circuit board 101 (at least two millimeters) and the height of the magnetic head 102 (about ten millimeters) and the flexible displacement element 1021. Consequently, the minimum thickness of readers of prior art is at least twelve millimeters without even counting the height of a slot for inserting a card and the thickness of the plastic cover required to protect the device. This thickness of card readers is as such greater than that of a modern mobile communication device (about 10 mm). This substantial difference in thickness brings on the one hand a negative aesthetic impact on the paired device and on the other hand a disadvantage on the portability of the paired device.

It is therefore required to have a solution that makes it possible to reduce the thickness of removable readers while still integrating therein a payment interface of the smart card type and an interface of the magnetic payment card type.

SUMMARY

This disclosure makes it possible to overcome at least some of the problems caused by the contactless communication antennas of prior art. More particularly, the technique proposed related to a card reader comprising a printed circuit board, a magnetic head and a smart card connector. According to the present technique, said magnetic head and said smart card connector share a common operating volume for card reading.

As such, it is possible to substantially reduce the volume of a device that integrates the card reader.

According to a particular embodiment, the printed circuit board comprises an opening within which said magnetic head is mobile between an idle position, wherein the magnetic head is not solicited, and a reading position, wherein the magnetic head is displaced in said opening.

As such, the thickness of the card reader comprising this printed circuit board and a magnetic head is significantly reduced. Indeed, the magnetic head is mobile between an idle position (wherein the head is not mobilised), and a reading position wherein the head is pressed into the opening. According to the embodiments, in reading position, a more or less significant portion of the magnetic head takes up space in a volume for reading dedicated to the displacement and to the reading of a smart card; in other embodiments, the upper reading surface of the magnetic head is located on the same side of a printed circuit board, which then makes it possible to require only a single slot in the card reader.

According to a particular embodiment, in reading position, said magnetic head occupies a portion of the volume dedicated to the displacement of a smart card.

According to a particular characteristic, in reading position, a portion of the magnetic head takes up space within a secure protective enclosure of said smart card connector.

The sensitive signals are transmitted, from the lower surface of the magnetic head to the card reader by the intermediary of the flexible printed circuit. Attacks are carried by introducing probes in the zone around the lower surface of the magnetic head and the flexible printed circuit. The secure enclosure around this zone makes it possible to detect attacks and improve the level of security of the card reader.

According to a particular embodiment, said magnetic head and said smart card connector share at least partially the same card insertion slot.

According to a particular embodiment, the card reader comprises a flexible printed circuit, said flexible printed circuit that connects said magnetic head to said printed circuit board.

As such, the magnetic head can be displaced while still retaining a connection with the printed circuit board. Moreover, when a more or less significant portion of the magnetic head takes up space in a space for reading dedicated to the smart card connector, in reading position, the flexible printed circuit also takes up space in this secure enclosure. Significant savings in thickness are as such realised, making it possible to reduce the thickness of the card reader to that of a conventional modern communication terminal (about 10 mm).

According to a particular embodiment, the card reader comprises at least one support element that maintains said magnetic head in the opening of said printed circuit board which is shaped to allow for a translation of the magnetic head in said opening according to a direction perpendicular to said printed circuit board.

As such, the magnetic head can be pushed slightly downwards during the passage of a card. The contact between the magnetic head and the card becomes narrower thanks to the retraction force generated by the support elements.

According to a particular characteristic, said upper contact surface of said connector and said upper reading surface of said magnetic head have opposite reading directions.

As such, the magnetic cards and smart cards are read respectively in both sides of the card reader.

According to a particular embodiment, said upper contact surface of said connector and said upper reading surface of said magnetic head have the same reading direction.

As such, the magnetic cards and smart cards are read in the same side of the card reader. The card reader is compatible with two types of cards although the thickness of the card reader remains the same as that of the card reader comprising solely a magnetic head.

According to a particular characteristic, the orientation of the lecture of a smart card is perpendicular to the orientation of the reading of a magnetic card. It is as such possible to introduce the magnetic card in a given reading direction, and the smart card in a perpendicular direction of reading: this avoids the necessity of having to detect the type of card to be inserted.

According to another aspect, this technique also relates to a removable payment terminal. Such a payment terminal comprises a card reader according to any of the preceding claims. According to another aspect, this technique also relates to a payment terminal that is conventional, but compact. Such a payment terminal comprises a card reader according to any of the preceding claims.

FIGURES

Other characteristics and advantages shall appear more clearly when reading the following description of a particular embodiment of this technique, given simply for the purpose of illustration and in a non-restricted manner, and of the annexed drawings, among which:

FIG. 4b-1 is a top view of the printed circuit during the reading of a smart card;

FIG. 4b-2 is a cross-section view of the printed circuit of FIG. 4b during the reading of a smart card;

FIG. 4c-1 is a top view of the printed circuit during the reading of a magnetic card;

FIG. 4c-2 is a cross-section view of the printed circuit of FIG. 4b during the reading of a magnetic card;

FIG. 6b-1 shows the passage of a magnetic card in the case of use shown in relation with FIG. 4b-1;

FIG. 6c-1 shows the passage of a magnetic card in the case of use shown in relation with FIG. 4b-1;

DESCRIPTION OF THE INVENTION

Figure 1:
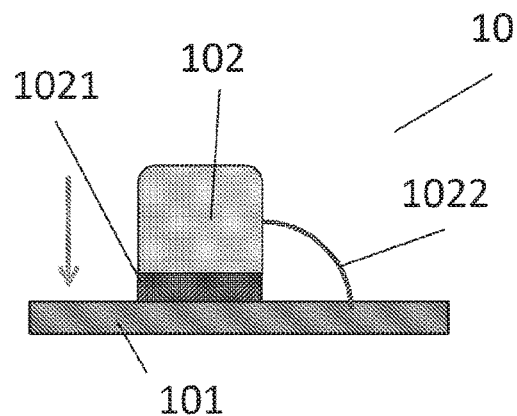
FIG. 1 is a cross-section view of a card reader inserted into a removable reading device of prior art.

As explained hereinabove, the technique proposed aims to reduce the thickness of compact and removable payment terminals comprising a magnetic reading head and a smart card connector in order to improve the aesthetics and the portability of these terminals. Generally, the technique proposed also aims to enable the simplified integration of a magnetic reading head and of a smart card connector within any payment terminal architecture, whether or not it is removable. Moreover, an object of the technique is also to propose an architecture that can facilitate the certification of such a terminal. As such, the technique can be applied to the manufacture of any type of terminal, when a restriction concerning compactness and/or transport must be satisfied. For example identification terminals, in airports, hotel rooms could indeed use the principles described in this document.

The general principle of the technique proposed consists in proposing a card reader, formed of a printed circuit and of a magnetic reading head and of a smart card connector. According to the technique proposed, the objective is achieved by shaping the printed circuit board so that it comprises an opening able to receive a portion of a magnetic head. As such, the sum of the thickness of the printed circuit board and of the height of the magnetic head is reduced by a value at least equal to the thickness of the printed circuit board, and even more as is explained in what follows in different embodiments. The use of such a card reader is not limited to the manufacture of payment terminals. It can be used in any type of device comprising a magnetic head and which requires a reduced thickness. The technique proposed can be in particular implemented in magnetic card readers that offer access to a good or service, such as the magnetic card readers of hotel rooms. In what follows various embodiments of the technique are disclosed. In the figures, the cover and outer casings are not shown for more clarity in the drawings.

Figure 2A:
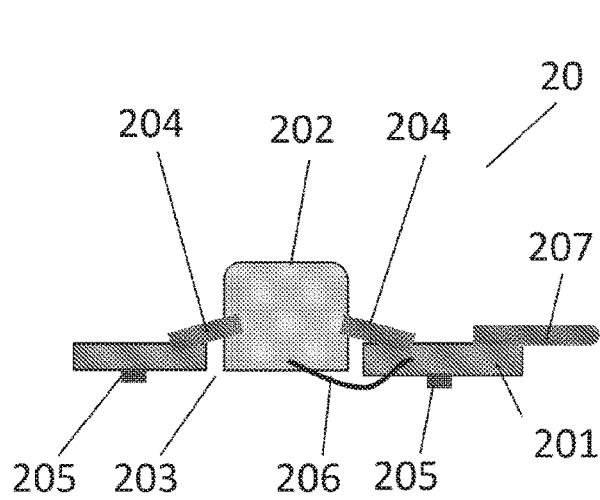
FIG. 2a is a cross-section view of a card reader according to a first embodiment.
Figure 2B:
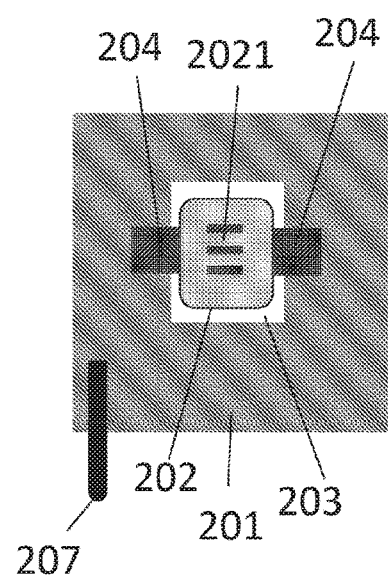
FIG. 2b is a top view of the card reader according to the first embodiment.
Figure 2C:
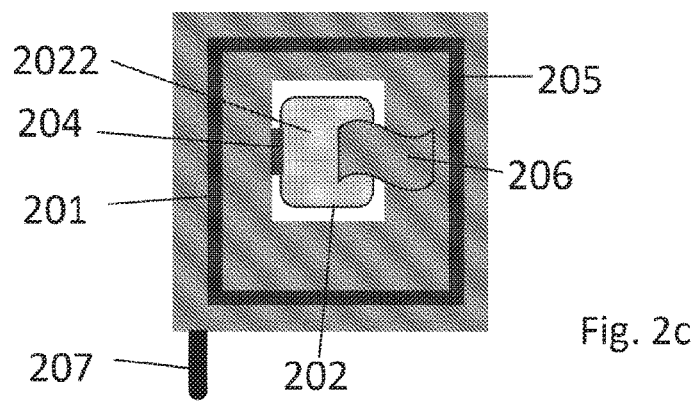
FIG. 2c is a bottom view of the card reader according to the first embodiment.

FIGS. 2a, 2b and 2c show a card reader 20 according to a first embodiment of the invention. The card reader 20 comprises a printed circuit board 201, a magnetic reading head 202 (also called magnetic head). A portion of the magnetic head 202 is placed in an opening 203 made on the printed circuit board 201. Preferably, the lower surface 2022 (the base) of the magnetic head 202 is substantially parallel to the plane of the printed circuit board 201. Support elements 204 maintain the magnetic head 202 in the opening 203. Preferably, the support elements 204 have a certain elasticity and are configured in such a way as to enable a translation of the magnetic head in the opening of the printed circuit board according to a direction perpendicular to the plane of the printed circuit board 201. When a magnetic card passes above the magnetic head 202 in order to be read, a force is exerted on the magnetic head 202 by the card. The support elements 204 are deformed and the magnetic head 202 is displaced within the opening 203. The deformation of the support elements 204 generates, in return, an elastic force on the magnetic head 202 (towards the magnetic strip of the magnetic card), and makes it possible to provide a narrow contact between the upper reading surface 2021 of the magnetic head 202 and the magnetic strip or strips of the magnetic card. The magnetic head 202 can be connected to the printed circuit board by the intermediary of a flexible printed circuit 206 which can supply the magnetic head 202 and transmit signals to the printed circuit board 201. Preferably, as shown in relation with FIG. 2c, the lower surface 2022 of the magnetic head 202 and the flexible printed circuit 206 are surrounded by a secure enclosure 205 arranged on the surface opposite the printed circuit board 201. This secure enclosure 205 makes it possible to detect and/or to prevent intrusions in the sensitive zone of the card reader. The security of the reader is as such reinforced. Of course, in the figures, the enclosure 205 is not shown in height and actual configuration. Moreover, the enclosure itself is covered with a cladding, which is also not shown, which makes it possible to define a secure zone within which it is complex to introduce a spy device. Recall indeed that payment terminals, whether in the form of autonomous devices (as is generally the case) or in the form of compact devices that have to be paired with another terminal (as is the case in the embodiment presented here), are devices that process sensitive data. Such sensitive data is for example banking identifiers. This sensitive data attracts the attention of ill-intentioned people who wish to steal this data. It is therefore necessary to have protective functions. In the example of prior art shown in FIG. 1, particular protections must be implemented around the magnetic head in order to ensure that the latter is not the object of an attack. In the technique such as shown in FIGS. 2a to 2c, this is not the case: indeed an existing enclosure, placed on the back of the printed circuit board (enclosure which is intended to protect the sensitive data of the device), is taken advantage of for on the one hand offering a possibility of displacement to the magnetic head (and as such reduce the thickness of the device) and on the other hand for protecting the sensitive signals that exit from the magnetic head (by ensuring that the transmission flex of the signals of the magnetic head is found inside the enclosure). It is therefore not possible to reach this flexible without attempting to piece the secure enclosure, which makes the task clearly more complex. As such, this technique, in addition to the fact that it resolves the aforementioned problems, furthermore makes it possible to increase the security of the devices while decreasing the cost of manufacturing them since it is no longer necessary to provide specific devices to protect the magnetic head. Moreover, this technique makes it possible to obtain a security certification (for example PCI certification) much more easily and quickly than prior devices: indeed, among the tests performed to obtain certification, tests specifically concerning the securing of the data transiting through the magnetic head. In this embodiment, in that the data transits within the secure enclosure, it is much less accessible than the devices of prior art. Note that the secure enclosure (of which the description is not the object of this document), is useful when the technique is implemented for a terminal that requires particular protective measures (payment terminal, identification terminal). This is not necessarily the case in the framework of a standard terminal such as a reader for access to a hotel room for example.

In this embodiment, the printed circuit board can also include an external connector 207 (jack as in document USD711876 or in document WO2013074499, but also USB, Mini USB or Micro USB, with the latter having, in relation to a connector jack, the advantage of allowing for more substantial exchanges of data with the mobile communication device and to enable a transmission of energy to the payment terminal). As such, the card reader (for example, a removable payment terminal) can be connected with another device (for example, a mobile communication device such as a smartphone). Of course, the card reader proposed can be implemented in any type of device that requires a magnetic head and that must be compact. The external connector 207 is as such optional.

The technique proposed also relates to a card reader for hybrid devices that can read both magnetic strip cards and cards with a chip (also called "smartcard").

Figure 3A:
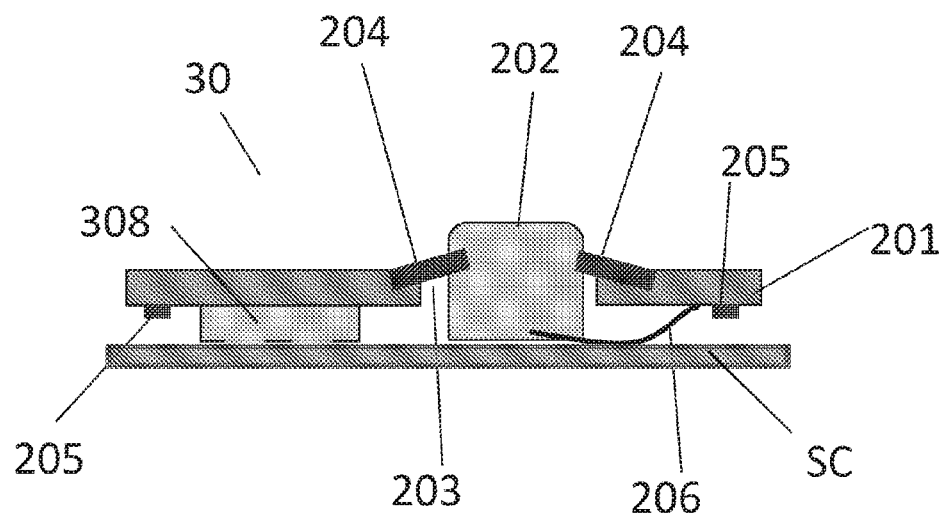
FIG. 3a is a cross-section view of a card reader according to a second embodiment.
Figure 3B:
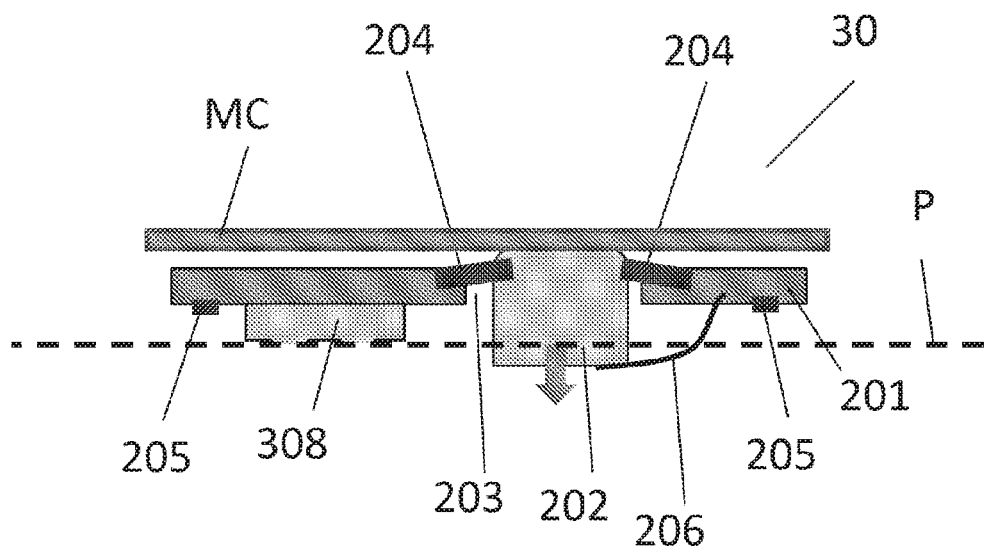
FIG. 3b is a cross-section view of the card reader of 3a during the reading of a magnetic card.

FIGS. 3a and 3b show a card reader 30 according to a second embodiment. The numerical references that refer to the elements present in the first embodiment are identical in this second embodiment. The card reader 30 comprises a printed circuit board 201, a magnetic head 202. It also comprises a smart card connector 308, and makes it possible to read magnetic cards (MC) and smart cards (SC). The thickness of such a smart card connector 308 is less than that of the magnetic head 202. This smart card connector 308 can be directly soldered onto the lower surface of the printed circuit board 201, as shown in FIGS. 3a and 3b. The upper contact surface (the surface that touches the smart card) of the connector 308 is directed downwards, while the upper reading surface of the magnetic head 202 is oriented upwards (relative position on these two figures). The orientations of the connector 308 and of the magnetic head are as such opposite: the plane which is used to define this opposition is that of the printed circuit board 201. The magnetic head 202 is placed in the opening 203 of the printed circuit board 201. Support elements 204 maintain the magnetic head 201 in the opening 203 the printed circuit board 201. Preferably, the support elements 204 have a certain elasticity and are configured in such a way as to allow for a translation of the magnetic head in the opening of the printed circuit board according to a direction perpendicular to the printed circuit board, as in the first embodiment. As shown in relation with FIG. 3b, when a magnetic card (MC) passes above the magnetic head 202, a downward force is exerted on the magnetic head 202. The support elements 204 are deformed and the base of the magnetic head 202 is displaced downwards, in the secure enclosure, to the location where the smart card is normally positioned when the latter is used. The deformation of the support elements 204 generate an elastic force on the magnetic head 202 upwards (towards the magnetic strip of the magnetic card), and makes it possible to provide a narrow contact between the upper reading surface of the magnetic head 202 and the magnetic strip of the magnetic card (MC). The magnetic head 202 is connected to the printed circuit board by the intermediary of a flexible printed circuit 206 which can supply the magnetic head 202 and transmit signals. In this embodiment, the smart card connector 308, the base 2022 of the magnetic head 202 and the flexible printed circuit 206 are surrounded by a secure enclosure 205 arranged on the lower surface of the printed circuit board 201. This secure enclosure 205 makes it possible to detect and/or prevent intrusions in the sensitive zone of the card reader. The security of the hybrid card reader is as such reinforced, as in the first embodiment. A difference can however be noted: the cladding, which makes it possible to close the secure enclosure 205, is also provided with an opening that enables the chip of the smart card to come into contact with the connector. More specifically, in this embodiment, the cladding is a smart card reader (also called a CAM reader). In this embodiment, this cladding is therefore secure.

According to this second embodiment, the base of the magnetic head 202 can extend beyond the lower surface of the printed circuit board 201 at least until the plane (P) of the upper contact surface of the smart card connector 308 (or even more, as indicated in FIG. 3b) according to the distance left free between the smart card connector 308 and the cladding. As such, in relation to the solution of prior art according to which the magnetic head is mounted on the printed circuit board 201 (directly or indirectly by the intermediary of a dampener), the solution according to this second embodiment makes it possible to decrease the height of the card reader 30 by a value (maximum) which is substantially equal to the sum of the thickness of the printed circuit board 201 and the thickness of the smart card connector 308. Indeed, in the initial position (cf. FIG. 3a) of the magnetic head 202 (shown in FIG. 3a), the base of the magnetic head 202 cannot extend beyond the plane of the upper contact surface of the smart card connector 308. If such an extending were implemented, the insertion of a smart card (SC) would be blocked by the bottom portion of the magnetic head 202. However, during the reading of a magnetic card (MC), the magnetic card (MC) pushes the magnetic head 202 downwards and the lower surface of the magnetic head 202 can extend beyond the plane (P) of the reading surface of the smart card connector 308 (cf. FIG. 3b), as this extending is temporary (the magnetic head 202 will return to its initial position once the magnetic card is withdrawn, thanks to the retraction force generated by the deformation of the support elements 204). This is possible moreover because it is not considered to allow simultaneously a reading of a magnetic card and a reading of a smart card.

Figure 4A:
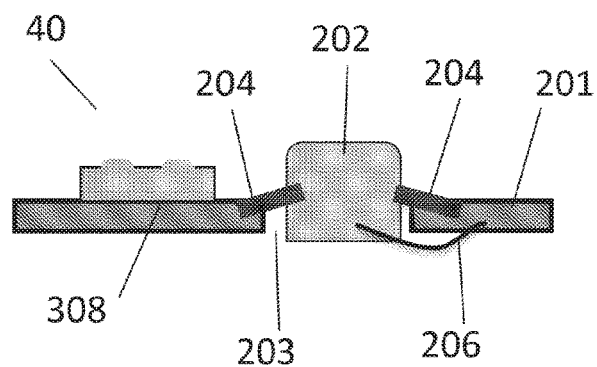
FIG. 4a is a cross-section view of a card reader according to a third embodiment.
Figures 1, 4B:
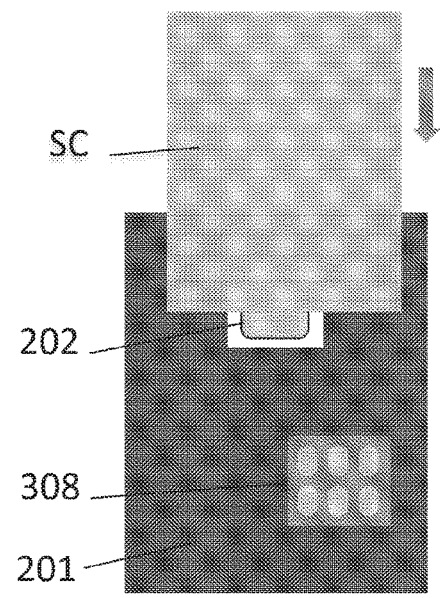

FIGS. 4a, 4b-1, 4b-2, 4c-1 and 4c-2 show another embodiment, wherein the orientation of the magnetic reading head and the orientation of the smart card connector are identical. As previously, the numerical references that correspond to elements present in the preceding figures are retained identically. The advantage procured by this embodiment is to not need two separate slots to perform the reading: the same slot can be used both to read a smart card and to read a magnetic card. This further makes it possible to reduce the thickness of the device as it is then not necessary to have specific plastic parts in order to create two slots for introducing two different types of cards. FIG. 4a is a cross-section view of a hybrid card reader 40 according to this third embodiment. The smart card connector 308 is directly soldered onto the upper surface of the printed circuit board 201. The upper contact surface (the surface that touches the smart card) of the connector 308 and the upper reading surface of the magnetic head 202 are oriented in the same direction (upwards in the figures). During the passing of a smart card (SC), the smart card (SC) first touches the magnetic head 202, which carries out a movement of translation in order to be released downwards as shown in relation with FIGS. 4b-1 and 4b-2. The contact between the smart card (SC) and the magnetic head 202 makes it possible, in this embodiment, to discharge the static electricity of the smart card (SC) before the latter is read by the smart card connector 308.

Figures 2, 4B:
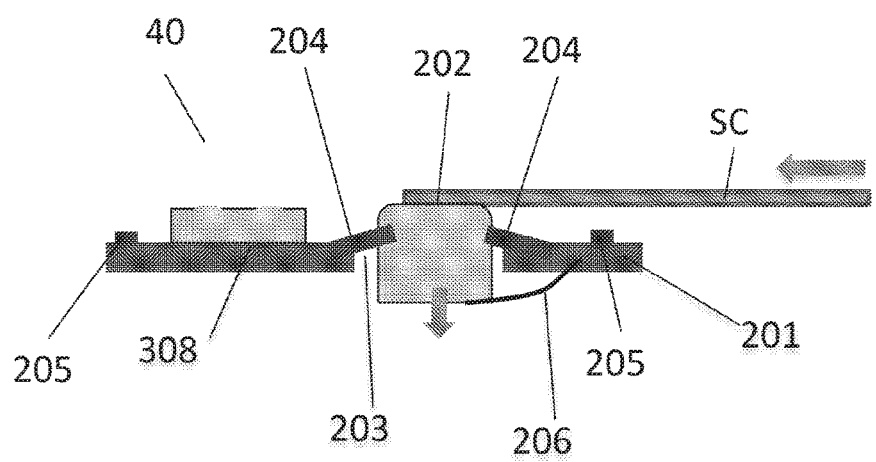
Figures 1, 4C:
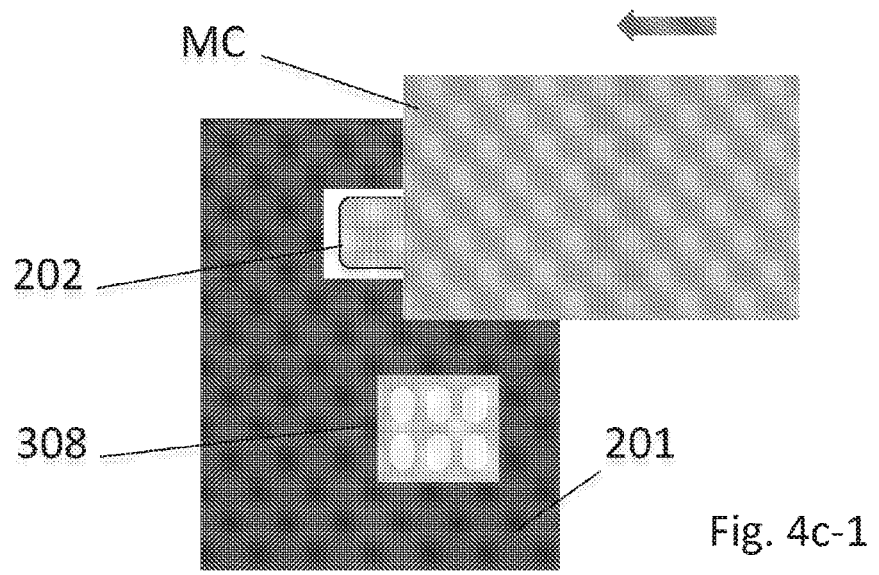
Figures 2, 4C:
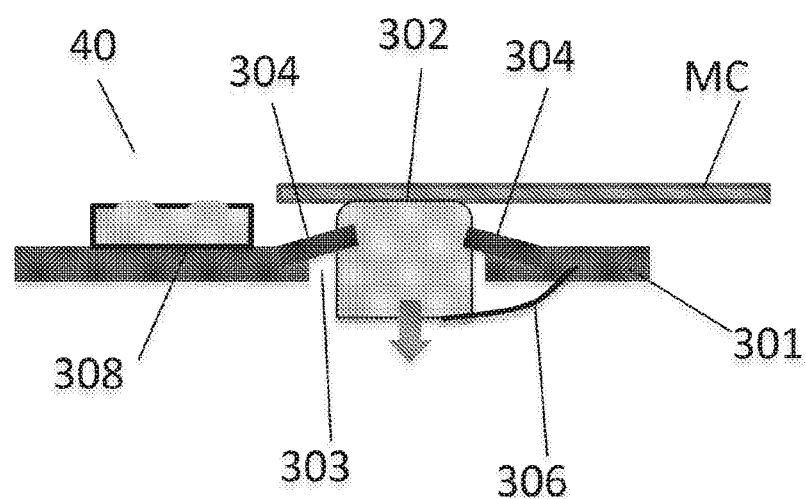

FIG. 4c-1 is a top view of the printed circuit board 201 during the passing of a magnetic card (MC). FIG. 4c-2 is a cross-section view of FIG. 4c-1. During the passage of the magnetic card (MC), the magnetic card (MC) pushes the magnetic head 202 downwards and the magnetic strip of the card (MC) slides on the upper reading surface of the magnetic head 202. In this embodiment, the direction of passage of the magnetic card is different from that of the smart card. Consequently, the magnetic card (MC) does not enter into the zone of the smart card connector 308.

Figures 5A, 5B, 5C:
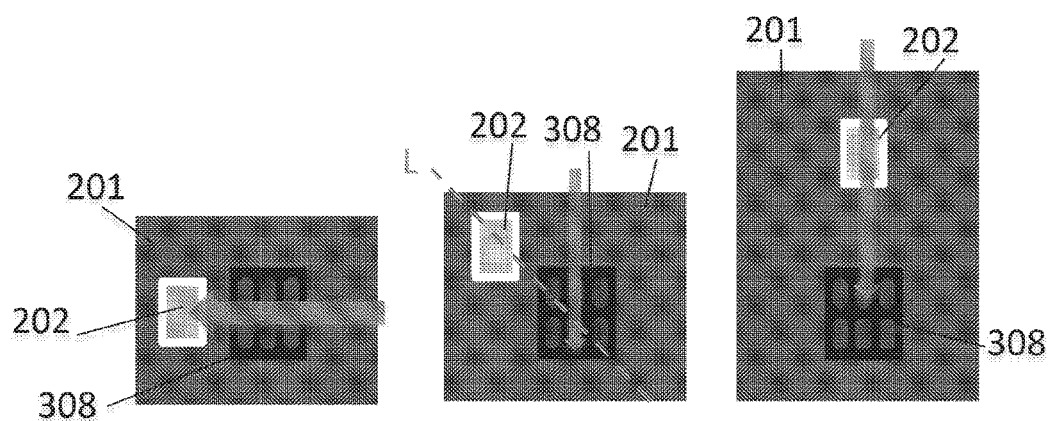
FIGS. 5a, 5b and 5c are three diagrammatical drawings of the positioning of the magnetic head and the smart card connector of the readers of the card reader according to the second or third embodiment.

The choice of the positions of the magnetic head 202 and the smart card connector 308 on the PCB circuits (of the second and of the third embodiment) is free. According to FIG. 5a, the connector 308 and the magnetic head 202 are aligned in the direction of sliding of the magnetic card. This solution makes it possible to have a compact card reader. According to FIG. 5c, the connector 308 and the magnetic head 202 are aligned in the direction of passage (of the "swipe" for those skilled in the art) of the smart card (SC). This positioning shown in FIG. 5c is identical to that of FIG. 4b-2, and allows the magnetic head 202 to discharge the static electricity of the smart card (SC) during the passage of the smart card. Furthermore, during the reading of a magnetic card (MC), the magnetic card (MC) does not enter into the zone of the smart card connector 308. In FIG. 5b, the magnetic head 202 and the smart card connector 308 are aligned according to a line (L) which forms an acute angle with the direction of insertion of the smart card. This positioning makes it possible to have a hybrid card reader that is relatively compact and provided with the function of discharging the static electricity of the smart card.

Figures 6A, 6B, 6C:
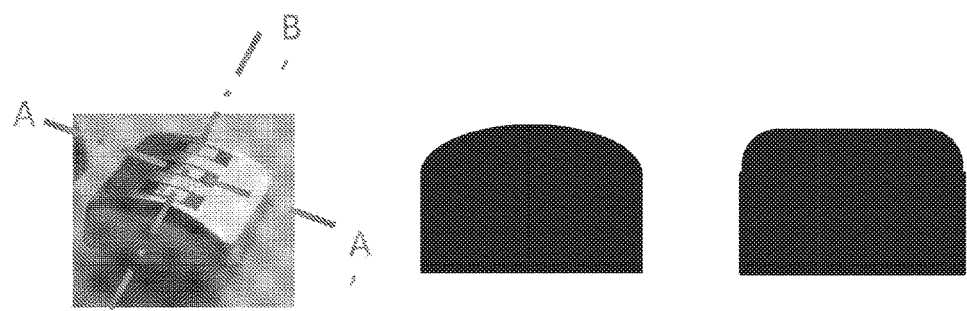
FIG. 6a shows a magnetic head of prior art.
FIG. 6b is a cross-section view of the magnetic head of FIG. 6a in the direction of passage (A-A') of the magnetic card.
FIG. 6c is a cross-section view of the magnetic head of FIG. 6a in the direction of passage (B-B') of the magnetic card.
Figures 1, 6B, 6C:
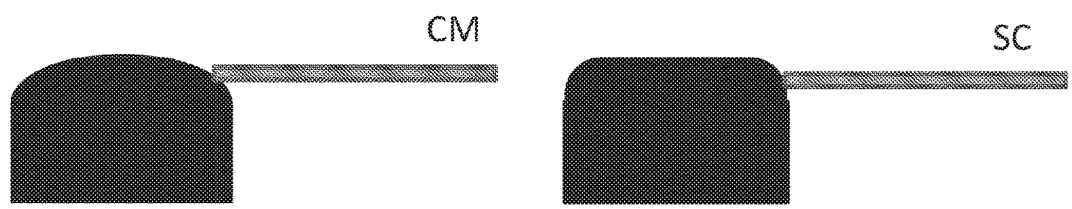

FIG. 6a shows a magnetic head of prior art. The upper surface of the magnetic head has an arched shape. During the reading of a magnetic card, the magnetic card passes in the direction A-A' shown in relation with FIG. 6a. FIGS. 6b and 6c respectively show a cross-section view of the magnetic head in the direction of passage (A-A') of the magnetic card and a cross-section view of the magnetic head in the direction (B-B') perpendicular to the direction of passage (A-A') of the magnetic card. The top of the cross-section according to FIG. 6b has the shape of an arc. Contrary to the cross-section view according to FIG. 6b, the top of the cross-section view of FIG. 6c is flat. Consequently, during the reading of a magnetic card as shown in relation with FIG. 4c-1, the shape of an arc at the top makes it possible to guide the magnetic card (MC) and dampen the impact thanks to the elasticity of the card (MC). However, in the case where the magnetic head and a smart card connector are aligned according to the direction of passage of the smart card (as shown in relation with FIG. 4b-1), the smart card (SC) comes into contact with an abrupt surface (FIG. 6c-1) of the magnetic head. This contact can result in an impact and block and even break the smart card. The technique proposed also relates to a magnetic head of which the upper surface is substantially in the shape of a dome and this in all of the directions of passage. Consequently, the cross-section views in the head in all directions still have the shape of an arc at the top. As such, the magnetic head according to the technique proposed also makes it possible to facilitate the passage of a card in a directions from that for the reading of a magnetic card.

The invention claimed is:

1. A card reader comprising:
A printed circuit board
A magnetic head; and
A smart card connector, said magnetic head and said smart card connector sharing a common operating volume for card reading;
Wherein the printed circuit board comprises an opening within which said magnetic head is mobile between a retracted, idle position, wherein the magnetic head is at least partially retracted relative to the opening and is not solicited, and a reading position, wherein the magnetic head is pressed into said opening providing a narrow contact between a reading surface of the magnetic head and a magnetic strip of a magnetic card.

2. The card reader according to claim 1, wherein, in the reading position, said magnetic head occupies a portion of the volume dedicated to the displacement of a smart card.

3. The card reader according to claim 1, wherein, in the reading position, a portion of the magnetic head takes up space within a secure protective enclosure of said smart card connector.

4. The card reader according to claim 1, wherein said magnetic head and said smart card connector share at least partially a same card insertion slot.

5. The card reader according to claim 1, further comprising a flexible printed circuit, said flexible printed circuit connecting said magnetic head to said printed circuit board.

6. The card reader according to claim 1, further comprising at least one support element that maintains said magnetic head in the opening of said printed circuit board which is shaped to allow for a translation of the magnetic head in said opening according to a direction perpendicular to said printed circuit board.

7. The card reader according to claim 1, wherein said smart card connector comprises an upper contact surface, and wherein said upper contact surface of said smart card connector and said reading surface of the magnetic head are located on a same side of said printed circuit board.

8. The card reader according to claim 1, wherein said smart card connector comprises an upper contact surface, and wherein said upper contact surface of the smart card connector and said reading surface of the magnetic head are located on opposite sides of said printed circuit board.

9. The card reader according to claim 8, wherein the card reader has an orientation of reading a smart card which is perpendicular to an orientation of reading a magnetic card.

10. A removable payment terminal, which comprises the card reader according to claim 1.

* * * * *